(12) United States Patent
Niebling et al.

(10) Patent No.: US 9,188,165 B2
(45) Date of Patent: Nov. 17, 2015

(54) ABS ENCODER ARRANGEMENT

(71) Applicant: Schaeffler Technologies GmbH & Co. KG, Herzogenaurach (DE)

(72) Inventors: Peter Niebling, Bad Kissingen (DE); Andreas Becker, Hammelburg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/422,610

(22) PCT Filed: Jun. 28, 2013

(86) PCT No.: PCT/EP2013/063584
§ 371 (c)(1),
(2) Date: Feb. 19, 2015

(87) PCT Pub. No.: WO2014/029535
PCT Pub. Date: Feb. 27, 2014

(65) Prior Publication Data
US 2015/0233428 A1 Aug. 20, 2015

(30) Foreign Application Priority Data
Aug. 22, 2012 (DE) .......................... 10 2012 214 872

(51) Int. Cl.
*F16C 33/72* (2006.01)
*F16C 41/00* (2006.01)
*F16C 33/78* (2006.01)

(52) U.S. Cl.
CPC ............ *F16C 41/007* (2013.01); *F16C 33/7866* (2013.01)

(58) Field of Classification Search
CPC .................................................... F16C 41/007
See application file for complete search history.

(56) References Cited

U.S. PATENT DOCUMENTS

| 2004/0036226 | A1 | 2/2004 | Hosoda et al. |
| 2004/0207160 | A1 | 10/2004 | Von Geisau et al. |
| 2005/0047692 | A1 | 3/2005 | Niebling et al. |
| 2007/0211974 | A1* | 9/2007 | Toth et al. ..................... 384/448 |
| 2008/0309322 | A1 | 12/2008 | Sentoku et al. |
| 2010/0111457 | A1* | 5/2010 | Walter et al. .................. 384/448 |
| 2011/0089642 | A1* | 4/2011 | Terasawa ..................... 277/562 |

FOREIGN PATENT DOCUMENTS

| DE | 696 06 928 T2 | 10/2000 |
| DE | 699 12 862 T2 | 9/2004 |
| DE | 103 38 959 | 3/2005 |
| DE | 103 61 900 A1 | 3/2005 |
| EP | 0 753 679 | 1/1997 |
| EP | 0 930 505 | 7/1999 |
| EP | 1 469 211 A1 | 10/2004 |

* cited by examiner

*Primary Examiner* — Thomas R. Hannon
(74) *Attorney, Agent, or Firm* — Davidson, Davidson & Kappel, LLC

(57) ABSTRACT

An ABS encoder arrangement including an annular disk core which bears a multipole structure, and a sealing ring element including an angular ring and an elastomer body forming a sealing lip structure, the angular ring including a lateral surface portion and an annular disk portion which protrudes radially inwards, the annular disk core being designed so as to project radially inwards beyond the inner circumferential surface of the lateral surface portion of the angular ring so as to form an annular projection, and a filling ring formed from an elastomer material being attached to the inner circumferential surface, the thickness of said filling ring being larger in radial direction than the size of the projection of the annular disk core in radial direction.

10 Claims, 1 Drawing Sheet

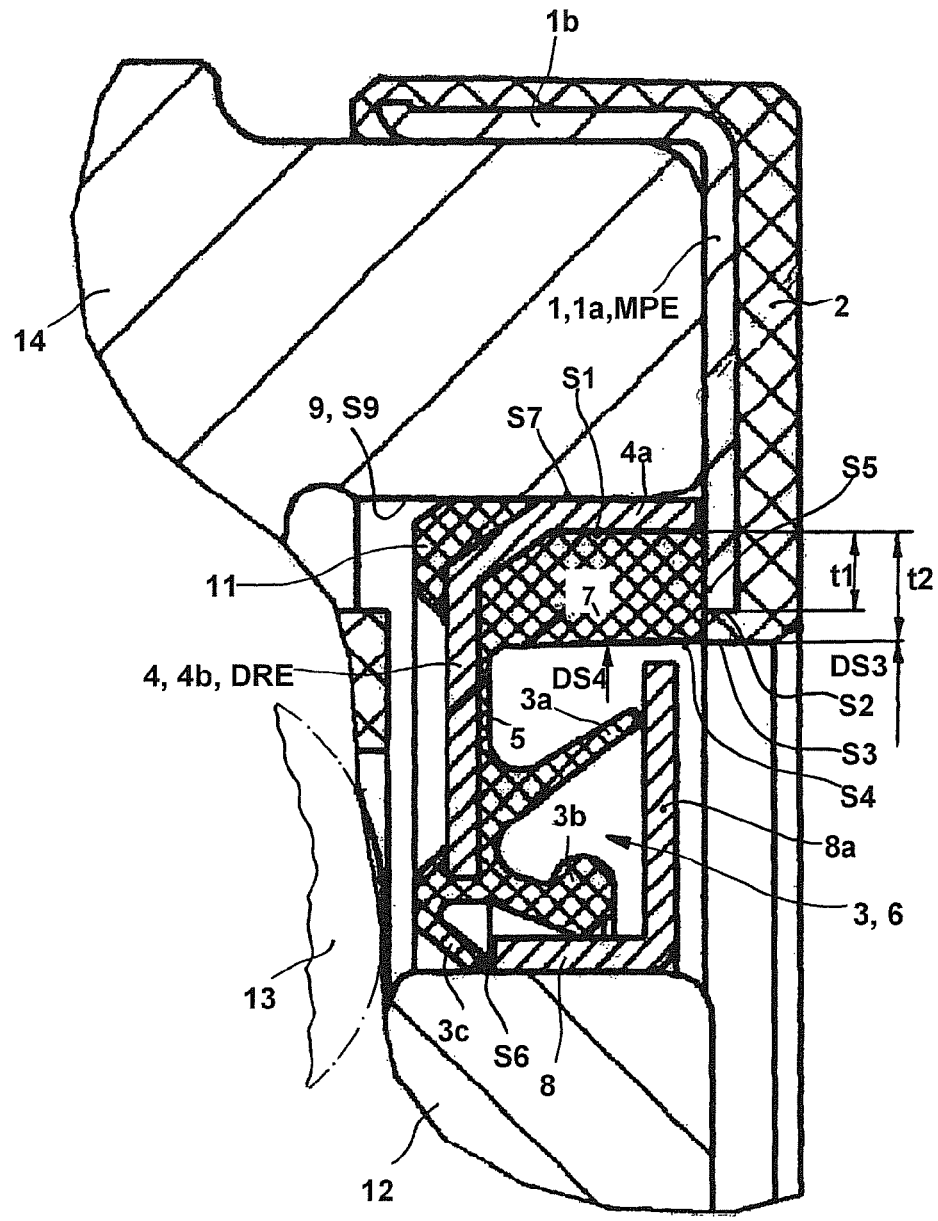

ABS ENCODER ARRANGEMENT

The present invention relates to an ABS encoder system, which serves to generate indicative signals in the area of a wheel bearing regarding the wheel rotation.

BACKGROUND

A generic ABS encoder system is known from DE 696 06 928 T2 . This ABS encoder system provides a seal configuration which includes a sealing ring having a sealing lip fixed on the side of the hub. The sealing ring sits in a ring gap between a wheel hub and a bearing inner ring. The sealing effect is achieved in that the sealing lip is in rubbing contact with a circumferential surface of the bearing inner ring or a ring on top of it. The seal configuration is covered from the outside by a ring element which carries a multi-pole structure. The multi-pole structure generates a magnetic field which may be detected by a corresponding sensor. The rotation frequency may be ascertained from the signals detected in this way in case the wheel hub rotates with respect to the bearing inner ring. These signals may be used on the vehicle side for triggering a braking system or an ESP system.

An ABS encoder system is also known from DE 699 12 862 T2 , in which a sealing device is provided in the area of a bearing ring gap. This ABS encoder system also includes a ring element which carries a multi-pole structure and which is installed axially from the outside onto a bearing gap which is sealed with the aid of a sealing ring.

A wheel bearing configuration is also known from DE 103 61 900 A1 in which a ring element having a multi-pole structure and a ring element having a sealing lip are assembled to form one unit. A relatively large ring gap space remains within this unit between the assembled ring elements.

An ABS encoder system is known from EP 1 469 211 A1 which includes a supporting ring, which is manufactured as a drawn sheet metal piece, onto which a multi-pole ring is molded. The multi-pole ring is made here from an elastomer material into which ferromagnetic particles have been admixed. The supporting ring is designed in such a way that it includes a seat section which is intended for attachment on a ring section moving on the wheel side, and that it also forms a ring flange, which projects radially inward, on which an elastomer sealing lip structure is anchored. The multi-pole ring and the sealing lip structure thus form a one-piece unit via the supporting ring.

SUMMARY OF THE INVENTION

It is an object of the present invention to provide an ABS encoder system which is characterized by a compact structure and where, in the surroundings of the ABS encoder system, an effective and long-lasting sealing of an adjacent bearing is ensured.

The present invention described herein makes it possible in an advantageous way to implement a relatively small inner diameter in the annular disk core and to assemble the sealing ring element and the annular disk core in such a way that any possible impurities that may flow or trickle into the area of the sealing lip structure as well as spray water and condensation water may essentially completely migrate from this sealing lip structure due to the effect of gravity or centrifugal force.

According to one particularly preferred specific embodiment of the present invention, the filling ring is formed of the same material as the sealing lip structure. The filling ring may here in particular be manufactured integrally with the sealing lip structure. A thin cover layer may be formed on top of the annular disk section between the filling ring and the sealing lip structure, this cover layer connecting the sealing lip structure and the filling ring.

According to one particular aspect of the present invention, the multi-pole structure is made from an elastomer material and is molded onto the annular disk core in such a way that the elastomer material overhangs an inner circumferential surface of the annular disk core with the inner border areas formed thereby. The annular disk core may be designed in such a way that the area of the multi-pole structure overhanging the inner circumferential surface of the annular disk core is limited by an inner circumferential wall, of which the inner diameter essentially corresponds to the inner diameter of the inner wall of the filling ring. In this way it is achieved in a particularly advantageous way that any flowable impurities which may possibly gather at the inner circumferential surface of the filling ring may drain "smoothly" via the inner edge of the multi-pole structure. In this way, the formation of a water pocket is avoided in an advantageous way since the respective space is taken up by the filling ring. In addition, a further improved sealing of the stationary sealing seat is achieved at the outer ring of the sealing ring element by having the encoder material rest on the front side of the filling ring.

It is possible in an advantageous way to geometrically adjust the sealing ring element and the annular disk core to each other in such a way that the elastomer area of the multi-pole structure which overhangs the inner side of the inner circumferential surface of the annular disk core rests sealingly on a front side of the elastomer filler ring. In the area of the contact surfaces, micro geometries, for example, sealary grooves contoured complementarily toward each other may be formed, which further support the sealing effect of this contact zone, or which may possibly even mesh with one another or snap in place.

According to one particularly preferred specific embodiment of the present invention, a sealing device in the shape of a so-called cartridge seal which includes a race is provided together with the sealing ring element. This race is preferably designed as a single piece with a guard ring, the outer circumference of the guard ring being smaller than the inner diameter of the filler ring. The guard ring may thus extend within the area enveloped by the filler ring and cover the front of the sealing lip structure. In addition, the front side now remains preferably axially below the level of the multi-pole structure, i.e., it is closer to the bearing.

The sealing lip structure may itself be designed in such a way that it forms multiple sealing lips. The sealing lip structure may be designed in such a way that it includes a guard lip (for example, a dust guard lip) touching the guard ring and a sealing lip (for example, a lubricant sealing lip) touching the race. In addition, on the sealing lip structure, an auxiliary lip may be formed which extends to a front side of the race and which dips down to the diameter level of the inner circumferential wall of the race, this auxiliary lip again separating the sealing lip which is in contact with the race from the bearing area.

A particularly robust and precise centered anchoring of the annular disk core on an in particular circumferential structure carrying the annular disk core (for example, a wheel hub) is achieved in that the annular disk core is provided with a cylindrical jacket ring surrounding the coding ring section. This cylindrical jacket ring is connected via a ring edge area with the ring disk section carrying the multi-pole structure and stabilizes it. After pressing the cylindrical jacket ring onto the assigned section, the annular disk core rests preferably flat on one front surface of the carrying section in the assembled state, typically a hub flange.

BRIEF DESCRIPTION OF THE DRAWINGS

Further details and features of the present invention are derived from the following description with reference to the drawing.

FIG. 1 shows an axial sectional representation of an ABS encoder system according to the present invention.

DETAILED DESCRIPTION

In FIG. 1 the design of an ABS encoder system is shown in the form of a detailed representation. The ABS encoder device according to the present invention includes an annular disk core 1 which carries a multi-pole structure 2. Furthermore, the ABS encoder system includes a sealing ring element which forms an angular ring 4 and an elastomer body connected to it, which forms a sealing lip structure 6.

Angular ring 4 includes a cylinder jacket section 4a and an annular disk section 4b, which extends radially inward, which carries the previously mentioned sealing lip structure 6.

Annular disk core 1 is, as is apparent, designed to project radially inward over an inner circumferential surface S1 of cylinder jacket section 4a of angular ring 4 by the extent t1 shown here. A filling ring 7 made from an elastomer material is connected to inner circumferential surface S1 of cylinder jacket section 4a, the filling ring having a thickness t2 which, measured in the radial direction, is larger than projection t1 of annular disk core 1 measured in the radial direction. It is apparent that filling ring 7 is integrally formed with sealing lip structure 6 and thus connected with sealing lip structure 6 via a cover layer section 5.

Multi-pole structure 2 is made from an elastomer material. Multi-pole structure 2 is designed in such a way that an inner border area thereof overhangs an inner circumferential surface S2 of annular disk core 1. The area of multi-pole structure 2 overhanging inner circumferential surface S2 of annular disk core 1 is limited by an inner circumferential wall S3, inner diameter DS3 of which essentially corresponds to inner diameter DS4 of inner wall S4 of filling ring 7. The area of multi-pole structure 2 overhanging inner circumferential surface S2 of annular disk core 1 rests sealingly on one front side S5 of filling ring 7.

Sealing device 3 is formed as a cartridge seal and includes a race 8. Race 8 is formed as one piece with a guard ring 8a. The outer diameter of guard ring 8a is smaller than inner diameter DS4 of filling ring 7 and thus also smaller than the inner diameter of annular disk core 1.

Sealing lip structure 6 is formed in such a way that it includes a guard lip 3a which is in contact with guard ring 8a, and a sealing lip 3b which is in contact with race 8. In addition, sealing lip structure 6 includes an auxiliary lip 3c which extends to one front surface S6 of race 8 and which dips down to the diameter level of the inner circumferential wall of race 8.

The annular disk core 1 is designed in such a way that it includes a coding ring section 1a which extends radially inward and a cylindrical jacket ring 1b which surrounds coding ring section 1a. Jacket ring 1b is also coated with the elastomer material which is intended for forming the multi-pole structure.

In the area of sealing ring element 3 as well as in the area of annular disk core 1, the elastomer material provided there is adhesively connected to the metallic ring structures. The adhesion may be achieved within the framework of a molding process. Metallic ring structures 1, 4 are manufactured as drawn components and respectively have an angle profile in their cross section.

Angular ring 4 of sealing ring element 3 forms a seat surface S7 in the area of the cylinder jacket section 4a with which sealing ring element 3 may be positioned in a cylindrical accommodating section 9 using a light press fit. In an outer corner area in which cylinder jacket section 4a is adjacent to annular disk section 4b, an elastomer ring section 11 is formed which seals the press fit gap between inner surface S9 of the accommodating section and outer circumferential wall S7. It is possible to provide a few small through bores (not shown in detail) in the corner area mentioned above which join elastomer ring section 11 with filling ring 7. It is thus made possible to feed the elastomer material which is required for forming elastomer ring section 11 in a technically advantageous way during the production of sealing ring element 3. In addition, this results in an advantageous form-locked anchoring of filling ring 7. It is also possible to join the elastomer ring section 11 with the joining section of auxiliary lip 3c.

The ABS encoder system shown here is designed as an ABS encoder system for a non-driven wheel, for example. Race 8 of the cartridge seal rests on a cylindrical circumferential surface section of a bearing inner ring 12 of an angular ball bearing including balls 13. Cylinder jacket section 4a of angular ring 4 sits in a cylindrical extension of wheel hub 14. Annular disk core 1, which carries multi-pole structure 2, is also pressed onto this extension of wheel hub 14.

The ABS encoder device according to the present invention includes three individual elements, i.e., multi-pole ring element MPE containing multi-pole structure 2, sealing ring element DRE and race 8. Sealing ring element DRE may be mounted separately from multi-pole ring element MPE and centers itself automatically within wheel hub 14 with a reliably adjustable press fit. Multi-pole ring element MPE is pressed onto wheel hub 14 after assembly of sealing ring element DRE and is in contact with front side S5 of the sealing ring element in a sealing manner when it reaches its functional position. Inner circumferential wall S4 of filling ring 7 has a smaller diameter than inner circumferential wall S2 of annular disk core 1. Inner circumferential surface S3 of the multi-pole structure is generally flush with the inner circumferential surface S4 of filling ring 7.

When wheel hub 14 rotates, multi-pole structure 2 rotates around a bearing axis defined by bearing ring 12. Multi-pole structure 2 has at least one, preferably multiple, magnetically active zones. These magnetically active zones may be detected by sensors which are not shown in detail. The thus generated signals having a resolution sufficient for ABS or ESP systems give information about the rotation of the respective wheel. Instead of designing the zones in the multi-pole structure as zones directly emitting a magnetic field, it is also possible to implement these zones as zones with high permeability, for example, by locally integrating ferro-magnetic particles. Moreover, it is also possible to provide at annular disk core 1 an axial profiling which enables a zone discrimination based on electromagnetic interaction effects, for example, with the aid of a Hall sensor.

LIST OF REFERENCE NUMERALS 1 annular disk core
1a coding ring section
1b jacket ring 2 multi-pole structure
3 sealing ring element
3c auxiliary lip
3a guard lip
3b sealing lip
4 angular ring
4a cylinder jacket section
4b annular disk section
5 cover layer section
6 sealing lip structure
7 filling ring
8 race
8a guard ring
9 accommodating section
11 elastomer ring section
12 bearing inner ring
13 balls
14 wheel hub
S1 inner circumferential surface
S2 inner circumferential surface
S3 inner circumferential wall
S4 inner wall
S5 front side
S6 front surface
S7 seat surface/outer circumferential wall
S9 inner surface
DS3 inner diameter
DS4 inner diameter
MPE multi-pole ring element
DRE sealing ring element
t1 extent
t2 thickness

What is claimed is:

1. An ABS encoder system comprising:
an annular disk core carrying a multi-pole structure;
a sealing ring element including an angular ring and an elastomer body attached to the annular ring to form a sealing lip structure;
the angular ring including a cylinder jacket section and an annular disk section projecting radially inward and carrying the sealing lip structure,
the annular disk core projecting radially inward over an inner circumferential surface of the cylinder jacket section of the angular ring to define a projection; and
a filling ring made from an elastomer material being connected to the inner circumferential surface of the cylinder jacket section of the angular ring, the filling ring having a thickness measured in the radial direction larger than the projection of the annular disk core measured in the radial direction.

2. The ABS encoder system as recited in claim 1 wherein the filling ring is integrally formed with the sealing lip structure.

3. The ABS encoder system as recited in claim 1 wherein the multi-pole structure is made from an elastomer material and overhangs an inner circumferential surface of the annular disk core.

4. The ABS encoder system as recited in claim 3 wherein the area of the multi-pole structure overhanging the inner circumferential surface of the annular disk core is limited by an inner circumferential wall, the inner diameter of the inner circumferential wall corresponding to the inner diameter of the inner wall of the filling ring.

5. The ABS encoder system as recited in claim 4 wherein the area of the multi-pole structure overhanging the inner circumferential surface of the annular disk core rests sealingly on one front side of the filling ring.

6. The ABS encoder system as recited in claim 1 further comprising a race, the race together with the sealing ring element defining a cartridge seal.

7. The ABS encoder system as recited in claim 6 wherein the race is formed as one piece with a guard ring, and that the outer circumference of the guard ring is smaller than the inner diameter of the filler ring.

8. The ABS encoder system as recited in claim 7 wherein the sealing lip structure includes a guard lip in contact with the guard ring, and a sealing lip in contact with the race.

9. The ABS encoder system as recited in claim 8 wherein the sealing lip structure includes an auxiliary lip extending to one front surface of the race and dipping down to the diameter level of the inner circumferential wall of the race.

10. The ABS encoder system as recited in claim 1 wherein the annular disk core includes a coding ring section extending radially inward and a cylindrical jacket ring surrounding the coding ring section.

\* \* \* \* \*